(12) United States Patent
Toyosawa (10) Patent No.: US 9,969,220 B2
(45) Date of Patent: May 15, 2018

(54) TIRE

(71) Applicant: BRIDGESTONE CORPORATION, Tokyo (JP)

(72) Inventor: Shinichi Toyosawa, Tokorozawa (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days. days.

(21) Appl. No.: 15/318,721

(22) PCT Filed: May 7, 2015

(86) PCT No.: PCT/JP2015/002326
§ 371 (c)(1),
(2) Date: Dec. 14, 2016

(87) PCT Pub. No.: WO2015/194088
PCT Pub. Date: Dec. 23, 2015

(65) Prior Publication Data
US 2017/0129285 A1    May 11, 2017

(30) Foreign Application Priority Data
Jun. 16, 2014    (JP) .................. 2014-123700

(51) Int. Cl.
*B60C 7/24*    (2006.01)
*B60C 7/14*    (2006.01)

(52) U.S. Cl.
CPC .............. *B60C 7/24* (2013.01); *B60C 7/14* (2013.01); *B60C 2007/146* (2013.01)

(58) Field of Classification Search
CPC ........ B60C 7/24; B60C 7/14; B60C 2007/146
(Continued)

(56) References Cited

U.S. PATENT DOCUMENTS 8,631,844 B2 * 1/2014 Anderfaas ................ B60B 9/04
152/40
8,783,310 B2 * 7/2014 Abe .......................... B60B 9/26
152/12
(Continued)

FOREIGN PATENT DOCUMENTS

JP    57-077202 A    5/1982
JP    05-330307 A    12/1993
(Continued)

OTHER PUBLICATIONS

International Search Report for PCT/JP2015/002326 dated Jul. 14, 2015.
(Continued)

*Primary Examiner* — S. Joseph Morano
*Assistant Examiner* — Jean Charleston
(74) *Attorney, Agent, or Firm* — Sughrue Mion, PLLC (57) ABSTRACT

A non-pneumatic tire includes: a ring member (14) including an inner cylinder (12) externally covering an attachment body (11) to be attached to an axle and an outer cylinder (13) surrounding the inner cylinder (12) from a tire radial outer side; a plurality of connecting members (15) arranged along a tire circumferential direction between the inner cylinder (12) and the outer cylinder (13) and connecting the two cylinders to each other; and a tread member (16) made of vulcanized rubber and located on a tire radial outer side of the outer cylinder (13), wherein at least one part of the outer cylinder (13) and the plurality of connecting members (15) are integrally formed of a synthetic resin material, and an adhesion layer (25) containing an epoxy-based adhesive agent is located between the tread member (16) and the outer cylinder (13) having an amino group in a surface thereof.

7 Claims, 4 Drawing Sheets

(58) Field of Classification Search
USPC .. 301/69, 70, 72, 73, 74, 80, 246, 247, 258, 301/259
See application file for complete search history.

(56) References Cited

U.S. PATENT DOCUMENTS

| | | | |
|---|---|---|---|
| 8,950,451 B2* | 2/2015 | Abe | B60C 7/18 152/12 |
| 2010/0218869 A1 | 9/2010 | Abe | |
| 2011/0024008 A1 | 2/2011 | Manesh et al. | |
| 2011/0108173 A1 | 5/2011 | Abe | |
| 2011/0198007 A1 | 8/2011 | Maeda | |
| 2011/0272254 A1 | 11/2011 | Anderfaas et al. | |
| 2013/0068363 A1 | 3/2013 | Ikemura | |

FOREIGN PATENT DOCUMENTS

| | | | |
|---|---|---|---|
| JP | 2005-161959 A | 6/2005 | |
| JP | 2011-219009 A1 | 11/2011 | |
| NL | 2002956 C | 12/2010 | |

OTHER PUBLICATIONS

Communication dated Sep. 7, 2017 from the State Intellectual Property Office of the P.R.C. in counterpart Application No. 2015800319490.
Loctite, Design Guide for Bonding Plastics, vol. 6, LT-2197, 2011, Henkel Corporation, total 100 pages, XP055375774.
Surface Roughness (JIS B 0601-2001), Technical Information R3, total 3 pages, XP055091052.

* cited by examiner

TIRE

CROSS REFERENCE TO RELATED APPLICATIONS

This application is a National Stage of International Application No. PCT/JP2015/002326 filed May 7, 2015, claiming priority based on Japanese Patent Application No. 2014-123700 filed Jun. 16, 2014, the contents of all of which are incorporated herein by reference in their entirety.

TECHNICAL FIELD

The disclosure relates to a non-pneumatic tire that can be used without being filled with pressurized air.

BACKGROUND

For pneumatic tires that need to be filled with pressurized air and always kept at constant internal air pressure during use, various measures have conventionally been taken to prevent a puncture which leads to such a state where the internal air pressure cannot be kept constant. However, the structure of pneumatic tires makes a puncture unavoidable.

In view of this, "non-air pressure tires" have been proposed in recent years as tires that need not be filled with pressurized air. For example, a "non-air pressure tire" includes: a support structure for supporting a load from the vehicle; a belt layer (omissible) provided on the outer circumferential side of the support structure; and a tread layer provided on the outer side (outer circumferential side) of the belt layer, where the support structure can be integrally molded using a resin as an example (see Patent Literature (PTL) 1).

In this "non-air pressure tire", the belt layer is formed by laminating layers of steel cords or the like coated with rubber, and bonded to the outer circumference side of the support structure made of the resin.

CITATION LIST

Patent Literature

PTL 1: JP 2011-219009 A

SUMMARY

Technical Problem

It is known that the state of bonding between the support structure which is attached to the axle and to which a driving force is transmitted and the tread layer which serves as contact patch in the conventional "non-air pressure tire" significantly influences the running function of the tire. It is also known that, depending on the type of the resin member forming the support structure, the adhesiveness to the rubber member forming the tread layer (or the belt layer) to which the support structure is to be bonded varies significantly.

Accordingly, particularly in the case where the support structure is composed of the resin member of a type not having good adhesiveness to the rubber member, it is very difficult to improve the adhesiveness between the resin member and the rubber member while ensuring necessary running function of the tire.

It could therefore be helpful to provide a non-pneumatic tire that has improved adhesiveness between a resin member forming a structure attached to an axle and a tread member serving as contact patch while ensuring necessary running function.

Solution to Problem

For accomplishing the object, a non-pneumatic tire of this disclosure includes: an attachment body to be attached to an axle; a ring member including an inner cylinder externally covering the attachment body and an outer cylinder surrounding the inner cylinder from a tire radial outer side; a plurality of connecting members arranged along a tire circumferential direction between the inner cylinder and the outer cylinder and connecting the inner cylinder and the outer cylinder to each other; and a tread member made of vulcanized rubber and located on a tire radial outer side of the outer cylinder of the ring member, wherein at least one part of the outer cylinder and the plurality of connecting members are integrally formed of a synthetic resin material, and an adhesion layer containing an epoxy-based adhesive agent is located between the tread member and the outer cylinder of the ring member, the outer cylinder having an amino group in a surface thereof. With this structure, the adhesiveness between a resin member forming a structure attached to an axle and a tread member can be improved while ensuring necessary running function.

Preferably, the tread member is surface-treated using a halogen compound, in the non-pneumatic tire of this disclosure. With this structure, the adhesion strength between the vulcanized rubber and the adhesive agent can be further improved.

Preferably, the synthetic resin material in the non-pneumatic tire of this disclosure contains one or a mixture of two or more of nylon 12, nylon 66, polybutylene terephthalate (PBT), polyphenylene sulfide (PPS), thermoplastic polyamide-based elastomer (TPAE), acrylonitrile-butadiene-styrene copolymer, polyetheretherketone (PEEK), syndiotactic polystyrene (SPS), polyacetal (POM), polyarylate (PAR), polyethersulfane (PES), polycarbonate (PC), polyamide (PA), a polymer or a copolymer of polysulfone (PSF), and an olefinic polymer. With this structure, non-pneumatic tire properties (rigidity and toughness) can be attained.

Preferably, the synthetic resin material in the non-pneumatic tire of this disclosure contains one or a mixture of two or more of polyphenylene sulfide (PPS), polycarbonate (PC), and polyamide (PA). With this structure, shock resistance can be further enhanced.

Preferably, surface roughness (Ra) of a part of the outer cylinder adhered to the tread member is 0.02 μm to 0.5 μm, in the non-pneumatic tire of this disclosure. With this structure, adhesion performance can be further improved by the anchor effect.

In the disclosure, "surface roughness (Ra)" is the arithmetic average surface roughness (Ra) (unit: μm) based on JIS B 0601 (1994).

Preferably, maximum height (Ry) of a part of the outer cylinder adhered to the tread member is 3 μm or less, in the non-pneumatic tire of this disclosure. With this structure, the adhesive agent adheres to the surfaces of the synthetic resin and vulcanized rubber more cleanly.

In the disclosure, "maximum height (Ry)" is the maximum height (Ry) (unit: μm) based on JIS B 0601 (1994).

Preferably, adhesion strength of the adhesion layer measured according to Adhesives—Determination of tensile lap-shear strength of rigid-to-rigid bonded assemblies in JIS K 6850 is 1.0 MPa or more at a temperature of 25° C., in the non-pneumatic tire of this disclosure. With this structure, adhesion strength can be maintained more successfully.

Preferably, adhesion strength of the adhesion layer measured according to Adhesives—Determination of tensile lap-shear strength of rigid-to-rigid bonded assemblies in JIS K 6850 is 0.3 MPa or more at a temperature of 80° C. in the non-pneumatic tire of this disclosure. With this structure, adhesion strength at high temperature during tire running can be maintained more successfully.

Advantageous Effect

It is thus possible to provide a non-pneumatic tire that has improved adhesiveness between a resin member forming a structure attached to an axle and a tread member while ensuring necessary running function.

DETAILED DESCRIPTION

The following describes one of the disclosed embodiments with reference to drawings.

Figure 1:
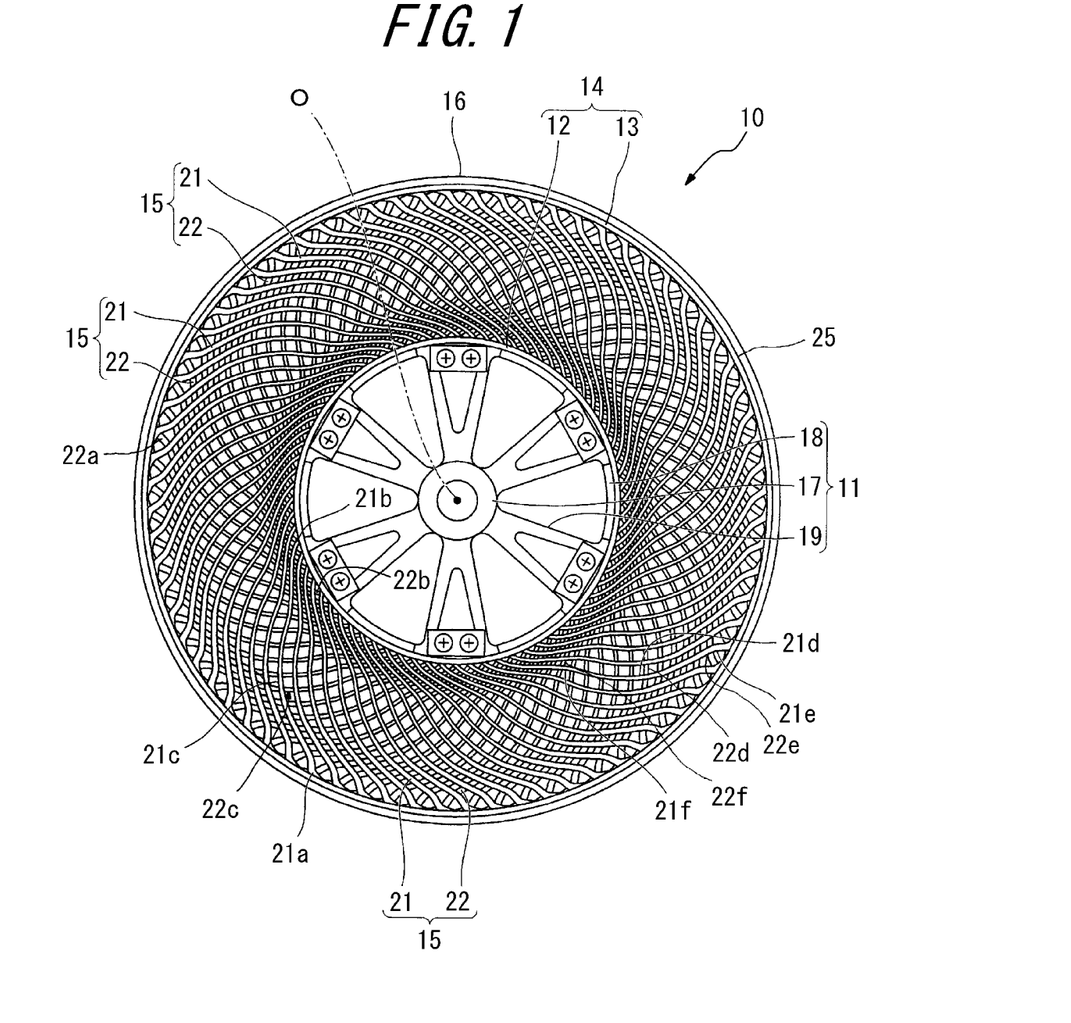
FIG. 1 is a view schematically illustrating the structure of a non-pneumatic tire according to one of the disclosed embodiments as seen from a tire side surface.
Figure 2:
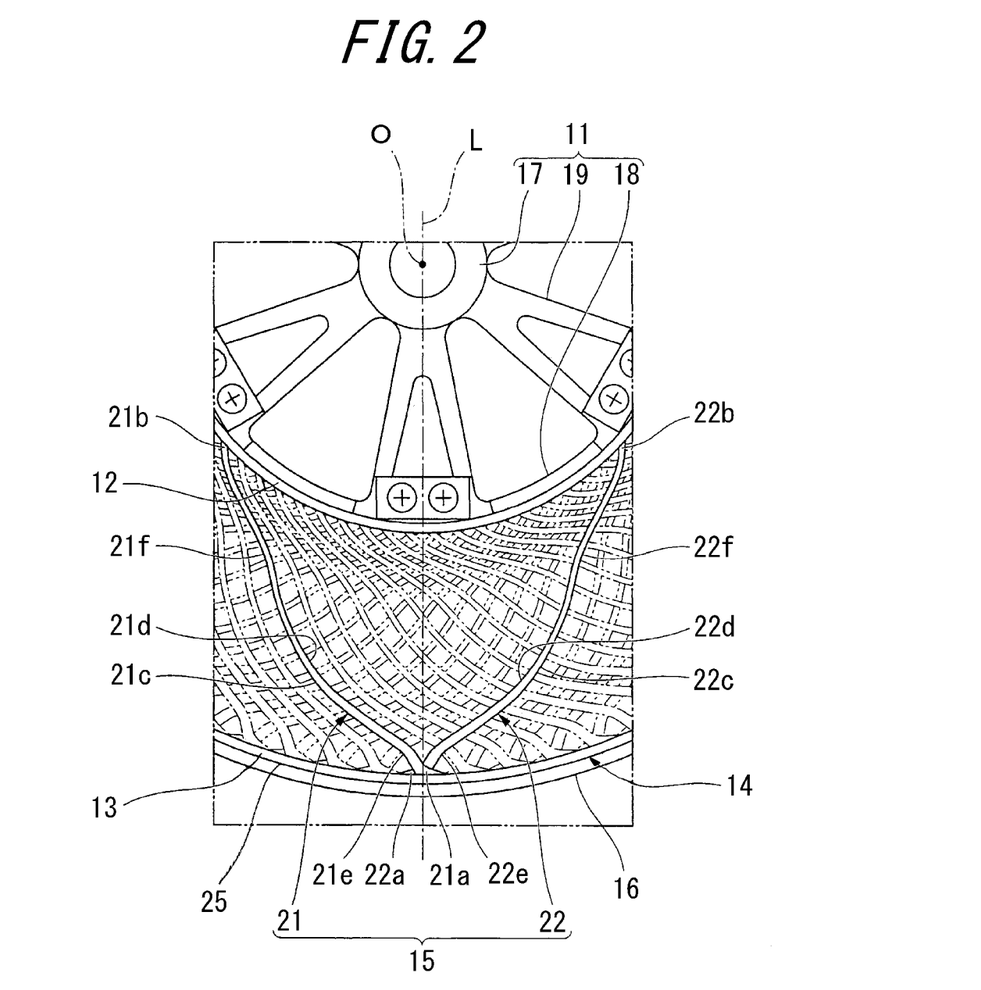
FIG. 2 is an enlarged view of part of the tire in FIG. 1.

FIG. 1 is a view schematically illustrating the structure of a non-pneumatic tire according to one of the disclosed embodiments as seen from a tire side surface. FIG. 2 is an enlarged view of part of the tire in FIG. 1. In FIG. 2, only one first elastic connecting plate 21 and one second elastic connecting plate 22 are illustrated with emphasis in solid lines from among the below-mentioned plurality of first elastic connecting plates 21 and plurality of second elastic connecting plates 22 for the sake of clarity.

As illustrated in FIGS. 1 and 2, a non-pneumatic tire 10 in this embodiment includes: an attachment body 11 to be attached to an axle (not illustrated); a ring member 14 including an inner cylinder 12 externally covering the attachment body 11 and an outer cylinder 13 surrounding the inner cylinder 12 from the tire radial outer side; a plurality of connecting members 15 arranged along the tire circumferential direction between the inner cylinder 12 and the outer cylinder 13 and connecting the cylinders 12 and 13 to each other; and a tread member 16 made of vulcanized rubber and integrally covering the outer circumference of the ring member 14.

The attachment body 11, the inner cylinder 12, the outer cylinder 13, and the tread member 16 have the same axis as a common axis or have their centers in the tire width direction coinciding with each other. The common axis is referred to as "axis O", the direction orthogonal to the axis O as "tire radial direction", and the direction circling around the axis O as "tire circumferential direction".

The attachment body 11 includes: a holding cylindrical portion 17 in which an end of the axle is held; an outer ring portion 18 surrounding the holding cylindrical portion 17 from the tire radial outer side; and a plurality of ribs 19 connecting the holding cylindrical portion 17 and the outer ring portion 18 (see FIGS. 1 and 2).

The holding cylindrical portion 17, the outer ring portion 18, and the ribs 19 are integrally formed of a metal material such as an aluminum alloy. The holding cylindrical portion 17 and the outer ring portion 18 are each shaped like a cylinder, and disposed coaxially with the axis O. The plurality of ribs 19 are arranged at regular intervals in the circumferential direction.

Each connecting member 15 includes a first elastic connecting plate 21 and second elastic connecting plate 22 connecting the inner cylinder 12 and outer cylinder 13 in the ring member 14 to each other. A plurality of first elastic connecting plates 21 are arranged along the tire circumferential direction at one position in the tire width direction, and a plurality of second elastic connecting plates 22 are arranged along the tire circumferential direction at the other position in the tire width direction different from the one position in the tire width direction. For example, a total of 60 first elastic connecting plates 21 and second elastic connecting plates 22 are provided.

In other words, the plurality of first elastic connecting plates 21 are arranged along the tire circumferential direction at the same position in the tire width direction, and the plurality of second elastic connecting plates 22 are arranged along the tire circumferential direction at the same position in the tire width direction away from the first elastic connecting plates 21 in the tire width direction.

The plurality of connecting members 15 are axisymmetrical with respect to the axis O, between the inner cylinder 12 and outer cylinder 13 in the ring member 14. All connecting members 15 have the same shape and the same size. The width of each connecting member 15 is less than the width of the outer cylinder 13 in the tire width direction.

First elastic connecting plates 21 adjacent in the tire circumferential direction are not in contact with each other, and second elastic connecting plates 22 adjacent in the tire circumferential direction are not in contact with each other. A first elastic connecting plate 21 and second elastic connecting plate 22 adjacent in the tire width direction are not in contact with each other.

The first elastic connecting plates 21 and the second elastic connecting plates 22 have the same width. The first elastic connecting plates 21 and the second elastic connecting plates 22 also have the same thickness.

One end 21a of the first elastic connecting plate 21 connected to the outer cylinder 13 is located more on one side in the tire circumferential direction than the other end 21b of the first elastic connecting plate 21 connected to the inner cylinder 12, and one end 22a of the second elastic connecting plate 22 connected to the outer cylinder 13 is located more on the other side in the tire circumferential direction than the other end 22b of the second elastic connecting plate 22 connected to the inner cylinder 12.

The respective ends 21a and 22a of the first elastic connecting plate 21 and second elastic connecting plate 22 differ in position in the tire width direction and are connected to the same position in the tire circumferential direction, on the inner circumferential surface of the outer cylinder 13.

In the illustrated example, a plurality of curved portions 21d to 21f curved in the tire circumferential direction are formed in an intermediate portion 21c of the first elastic connecting plate 21 between the end 21a and the other end 21b, along the extending direction of the connecting plate 21 in a tire lateral view of the tire 10 as seen from the tire width direction. Likewise, a plurality of curved portions 22d to 22f curved in the tire circumferential direction are formed in an intermediate portion 22c of the second elastic connecting plate 22 between the end 22a and the other end 22b, along the extending direction of the connecting plate 22 in a tire lateral view of the tire 10 as seen from the tire width direction. Curved portions adjacent in the extending direction from among the plurality of curved portions 21d to 21f in the connecting plate 21 are curved in opposite directions to each other, and curved portions adjacent in the extending direction from among the plurality of curved portions 22d to 22f in the connecting plate 22 are curved in opposite directions to each other.

The plurality of curved portions 21d to 21f formed in the first elastic connecting plate 21 are made up of: a first curved portion 21d curved to protrude to the other side in the tire circumferential direction; a second curved portion 21e located between the first curved portion 21d and the end 21a and curved to protrude to the one side in the tire circumferential direction; and a third curved portion 21f located between the first curved portion 21d and the other end 21b and curved to protrude to the one side in the tire circumferential direction.

The plurality of curved portions 22d to 22f formed in the second elastic connecting plate 22 are made up of: a first curved portion 22d curved to protrude to the one side in the tire circumferential direction; a second curved portion 22e located between the first curved portion 22d and the end 22a and curved to protrude to the other side in the tire circumferential direction; and a third curved portion 22f located between the first curved portion 22d and the other end 22b and curved to protrude to the other side in the tire circumferential direction.

In the illustrated example, the first curved portions 21d and 22d are respectively greater in radius of curvature in a tire lateral view than the second curved portions 21e and 22e and the third curved portions 21f and 22f. The first curved portions 21d and 22d are respectively situated in center parts in the extending directions of the first elastic connecting plate 21 and second elastic connecting plate 22.

The two elastic connecting plates 21 and 22 have the same length. As illustrated in FIG. 2, the other ends 21b and 22b of the elastic connecting plates 21 and 22 are respectively connected to the positions away from the positions facing the ends 21a and 22a in the tire radial direction toward the other side and the one side in the tire circumferential direction about the axis O by the same angle (e.g. 20° or more and 135° or less) on the outer circumferential surface of the inner cylinder 12, in a tire lateral view. In the first elastic connecting plate 21 and the second elastic connecting plate 22, the first curved portions 21d and 22d protrude in opposite directions to each other in the tire circumferential direction and have the same size, the second curved portions 21e and 22e protrude in opposite directions to each other in the tire circumferential direction and have the same size, and the third curved portions 21f and 22f protrude in opposite directions to each other in the tire circumferential direction and have the same size.

Thus, the shape of each connecting member 15 in a tire lateral view is line-symmetrical with respect to a virtual line L that extends along the tire radial direction and passes through the respective ends 21a and 22a of the connecting plates 21 and 22, as can be seen from the pair of first elastic connecting plate 21 and second elastic connecting plate 22 illustrated with emphasis in solid lines in FIG. 2.

In each of the connecting plates 21 and 22, one end portion from the center part in the extending direction to the end 21a or 22a is thicker than the other end portion from the center part to the other end 21b or 22b. This enhances the strength of the one end portion that tends to be under a heavy load in each of the first elastic connecting plate 21 and second elastic connecting plate 22, while preventing an increase in weight of the connecting member 15 and ensuring the flexibility of the connecting member 15. Here, the one end portion and the other end portion are smoothly linked together without any difference in level.

The ring member 14 may be divided, for example, at the center in the tire width direction into a one-side partial ring member on one side in the tire width direction and an other-side partial ring member on the other side in the tire width direction. In this case, the one-side partial ring member may be formed integrally with the first elastic connecting plates 21, and the other-side partial ring member formed integrally with the second elastic connecting plates 22. The one-side partial ring member and the first elastic connecting plates 21 may be formed integrally by injection molding, and the other-side partial ring member and the second elastic connecting plates 22 formed integrally by injection molding.

The ring member 14 is fixed to the attachment body 11 in a state where the inner cylinder 12 is fitted onto the attachment body 11.

In this embodiment, the ring member 14 made up of the inner cylinder 12 and the outer cylinder 13 and the plurality of connecting members 15 are all integrally formed of a synthetic resin material, and an adhesion layer 25 containing an epoxy-based adhesive agent is located between the tread member 16 and the outer cylinder 13 of the ring member 14.

The synthetic resin preferably has a bending elastic modulus of 1.5 GPa to 5 GPa. For example, the synthetic resin material contains one or a mixture of two or more of nylon 12, nylon 66, polybutylene terephthalate (PBT), polyphenylene sulfide (PPS), thermoplastic polyamide-based elastomer (TPAE), acrylonitrile-butadiene-styrene copolymer (ABS), polyetheretherketone (PEEK), syndiotactic polystyrene (SPS), polyacetal (POM), polyarylate (PAR), polyethersulfane (PES), polycarbonate (PC), polyamide (PA), a polymer or copolymer of polysulfone (PSF), and an olefinic polymer.

Of these, one or a mixture of two or more of polyphenylene sulfide (PPS), polycarbonate (PC), and polyamide (PA) is particularly desirable because of favorable shock resistance.

The synthetic resin material may be a mixture containing one or more of the aforementioned resin materials and one or more of elastomers other than those mentioned above, and may further contain additives such as an antioxidant, a plasticizer, a filler, and a pigment.

In the non-pneumatic tire 10 in this embodiment, the tread member 16 is cylindrical, and wholly covers the entire outer circumferential surface of the outer cylinder 13 of the ring member 14. The tread member 16 is made of vulcanized rubber obtained by vulcanizing a rubber composition containing, for example, natural rubber, for wear resistance and the like.

The following describes another example of the connecting members 15 connecting the inner cylinder 12 and the outer cylinder 13.

Figure 3A:
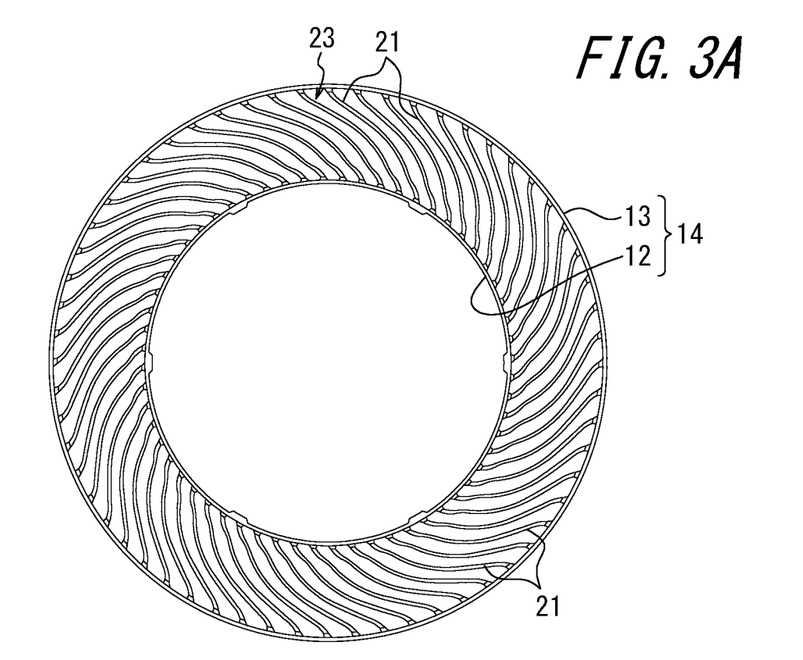
FIG. 3A is a front view of an inner cylinder and outer cylinder connected by connecting members according to another example.
Figure 3B:
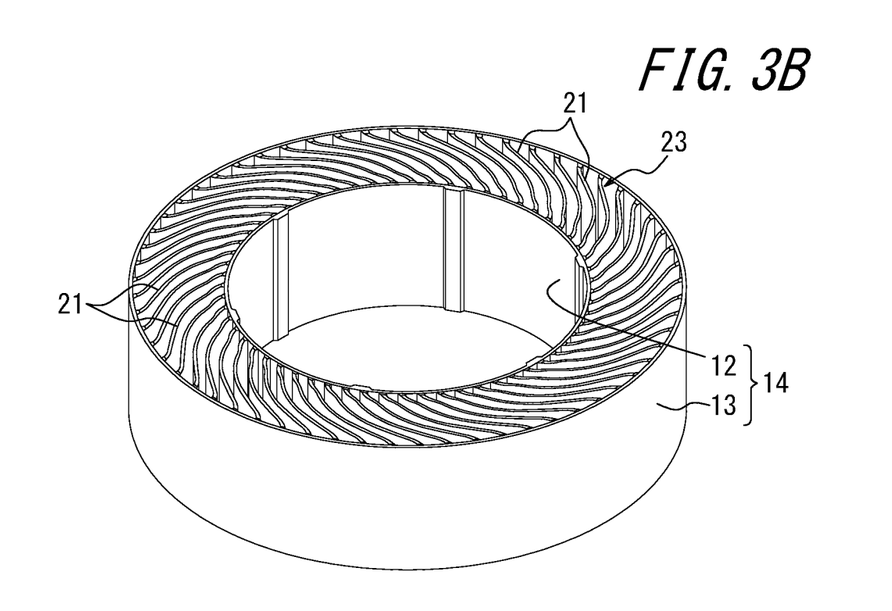
FIG. 3B is a perspective view of the inner cylinder and outer cylinder connected by the connecting members.

FIGS. 3A and 3B are respectively a front view and perspective view of the inner cylinder and outer cylinder connected by connecting members in another example. As illustrated in FIGS. 3A and 3B, each connecting member 23 includes only the first elastic connecting plate 21, unlike the connecting member 15 including the first elastic connecting plate 21 and the second elastic connecting plate 22. A plurality of first elastic connecting plates 21 each constituting a connecting member 23 are arranged along the tire circumferential direction between the inner cylinder 12 and the outer cylinder 13, and connect the cylinders 12 and 13 to each other. The other structures and functions are the same as those of the connecting members 15.

Figure 4:
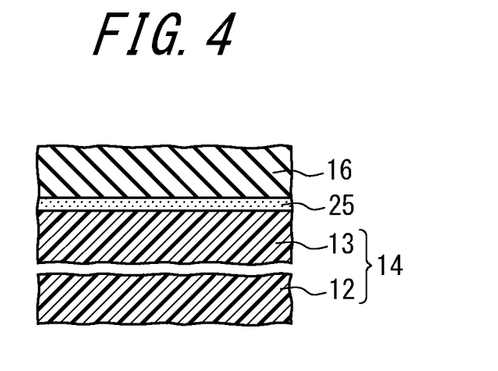
FIG. 4 is an enlarged view of part of an adhesion layer located between a ring member and a tread member in FIG. 1.

FIG. 4 is an enlarged view of part of the adhesion layer 25 located between the ring member 14 and the tread member 16 in FIG. 1. In this embodiment, the outer cylinder 13 of the ring member 14, in particular at least the outer circumferential surface of the outer cylinder 13 of the ring member 14 facing the tread member 16, is pretreated with an amine compound. As illustrated in FIG. 4, the adhesion layer 25 is located between the outer cylinder 13 of the ring member 14 pretreated as mentioned above and the tread member 16 to mediate the bonding between the outer cylinder 13 and the tread member 16, and contains an epoxy-based adhesive agent.

Thus, the adhesion layer 25 containing an epoxy-based adhesive agent and an amine compound is provided between the outer cylinder 13 of the ring member 14 pretreated with an amine compound and the tread member 16 in this embodiment. This ensures the bonding between the ring member 14 formed integrally with the plurality of connecting members 15 using the aforementioned synthetic resin material and the tread member 16 formed using vulcanized rubber.

Examples of the epoxy-based adhesive agent include LORD Far East Fusor 320/322 by LORD Far East Incorporated and ThreeBond® (ThreeBond is a registered trademark in Japan, other countries, or both) 2000/2100 by ThreeBond Co., Ltd. Examples of the amine compound include polyamide and tetramethyl hexanediamine.

In other words, adhesiveness can be improved by interposing the adhesion layer 25 containing the epoxy-based adhesive agent between the ring member 14 and the tread member 16. Moreover, by surface-treating the synthetic resin material with the amine compound having high heat resistance as pretreatment for the adhesion action by the epoxy-based adhesive agent, the adhered part can maintain high adhesion strength at tire running temperature more successfully. The pretreatment thus further improves the adhesiveness of the epoxy-based adhesive agent to the tread material.

In detail, the ring member 14 and the tread member 16 are adhered by the following method.

An example of the surface treatment method is given below. In the case where the synthetic resin material is polyphenylene sulfide, tetramethyl hexanediamine is dissolved in n-hexane to obtain a solution of about 2% as a treatment agent. The site subjected to adhesion is brushed with the solution, and then the solvent is dried for removal. After this, the epoxy-based adhesive agent is poured between the site and the tread material subjected to adhesion, and the adhesive agent is left to harden. The time required for the adhesive agent to harden depends on the environmental humidity and temperature, but several minutes are sufficient.

Particularly in the case where polyphenylene sulfide (PPS) is used as the synthetic resin material, the adhesiveness between the polyphenylene sulfide (PPS) and the tread material of vulcanized rubber, which has been difficult to be improved, can be significantly improved through the mediation of the adhesion layer 25 containing the epoxy-based adhesive agent and the amino group-containing compound.

This especially ensures the bonding between the ring member 14 and the tread member 16 while adequately maintaining necessary running function of the tire.

The adhesion strength of the adhesion layer 25 measured according to Adhesives—Determination of tensile lap-shear strength of rigid-to-rigid bonded assemblies (MS K 6850) is preferably 1.0 MPa or more at a temperature of 25° C. Thus, sufficient adhesion strength can be ensured and maintained more successfully at a temperature of 25° C.

The adhesion strength of the adhesion layer 25 measured according to Adhesives—Determination of tensile lap-shear strength of rigid-to-rigid bonded assemblies (JIS K 6850) is preferably 0.3 MPa or more and more preferably 0.6 MPa or more at a temperature of 80° C. Thus, sufficient adhesion strength can be ensured and maintained more successfully at a temperature of 80° C., i.e. at high temperature during tire running.

It is particularly preferable to satisfy all of the aforementioned two conditions of the adhesion strength of the adhesion layer 25.

The arithmetic average roughness (Ra) of the part of the outer cylinder 13 adhered to the tread member 16, that is, the outer circumferential surface of the outer cylinder 13 facing the tread member 16, is preferably 0.02 µm or more and more preferably 0.04 µm or more, and preferably 0.5 µm or less and more preferably 0.45 µm or less. The maximum height (Ry) is preferably 3 µm or less and more preferably 2.3 µm or less.

Moreover, appropriate surface treatment is preferably performed on the vulcanized rubber forming the tread member 16, as pretreatment for the adhesion action to the vulcanized rubber by the epoxy-based adhesive agent. This enhances the adhesion strength between the vulcanized rubber and the epoxy-based adhesive agent of the adhesion layer 25 and improves adhesiveness. Examples of the surface treatment on the vulcanized rubber include buffing, cyclization, chlorination, and methylene iodide method. More preferable surface treatment is organic active halogen compound method. The halogen compound used in the organic active halogen compound method is, for example, a halogen compound of isocyanuric acid. In this example, trichloroisocyanuric acid was used.

EXAMPLES

A plurality of types of non-pneumatic tires according to the disclosure were experimentally produced as examples (Examples 1 to 12), and compared with non-pneumatic tires of comparative examples (Comparative Examples 1 to 4). The non-pneumatic tires of these examples and comparative examples each had a tire size of 155/65R13, and had the structure illustrated in FIGS. 1 and 2.

The adhesive agent contained in the adhesion layer, the amine compound used for pretreating the outer cylinder of the ring member, the arithmetic average roughness and maximum height of the outer surface of the outer cylinder, and the adhesion strength of the adhesion layer are shown in Tables 1 to 6.

These experimental tires were subjected to a tensile durability test under the following test conditions and evaluated.

(Measurement of Adhesion Strength)

Each type of resin material was injection-molded into a dumbbell (JIS K 6251, dumbbell shape No. 1). The obtained dumbbell was cut in half at the center in the length direction, and used for an adhesion test. Vulcanized rubber was sandwiched between the two cut dumbbells, and the dumbbell surfaces were adhered and the adhesion strength was measured. As adhesion pretreatment, a pretreatment liquid was applied with a brush or the like, and then the solvent was dried for removal. After this, the adhesive agent was applied with a brush or the like, and the vulcanized rubber was sandwiched and left to harden while holding the structure with a clip or the like to prevent misalignment. The hardening time was set according to recommended conditions for the adhesive agent used. The adhesion area was 10 mm×10 mm, and the rubber thickness was 2 mm.

The dumbbell part of the adhesion sample was held by a chuck and pulled in opposite directions with a tension rate of 10 mm/min, and the force at break was measured. The measured force was divided by the adhesion area, to determine the adhesion strength. Two test environmental temperatures of 25° C. and 80° C. were used.

(Adhesion Durability Test)

An adhesion durability test was conducted for each sample whose adhesion strength at 80° C. was 0.2 MPa or more in the aforementioned measurement. The sample produced by the method described above was subjected to an adhesion durability test (tensile durability test) at 60° C., a frequency of 10 Hz, and a force of ±5 kgf using a dynamic fatigue tester (Servopulser made by Shimadzu Corporation), and the number of cycles until the sample broke was measured. The experimental data was converted to indices with 30000 cycles being set as 100. The maximum number of cycles was 100000.

TABLE 1

Ring member: PPS

|  | Comparative Example 1 | Comparative Example 2 | Comparative Example 3 |
|---|---|---|---|
| Adhesive agent | LORD Far East Fusor 320/322 | LORD Far East Fusor 320/322 | LORD Far East Fusor 320/322 |
| Vulcanized rubber pretreatment | Applied | Applied | Applied |
| Resin pretreatment | Not applied | Maleic modified polyethylene 2% xylene solution | Triphenylphosphine 2% ethanol solution |
| Arithmetic average roughness Ra (μm) | 0.21 | 0.21 | 0.22 |
| Maximum height Ry (μm) | 1.59 | 1.6 | 1.64 |
| Adhesion strength (25° C.) MPa | 0.33 | 1.53 | 0.83 |
| Adhesion strength (80° C.) MPa | 0.1 | 0.29 | 0.25 |
| Tensile durability test (index) | — | 30 | 15 |

TABLE 2

Ring member: PPS

|  | Example 1 | Example 2 | Example 3 |
|---|---|---|---|
| Adhesive agent | LORD Far East Fusor 320/322 | LORD Far East Fusor 320/322 | LORD Far East Fusor 320/322 |
| Vulcanized rubber pretreatment | Applied | Applied | Applied |
| Resin pretreatment | Tetramethyl hexanediamine 2% n-hexane solution | Tetramethyl hexanediamine 2% n-hexane solution | Tetramethyl hexanediamine 2% n-hexane solution |
| Arithmetic average roughness Ra (μm) | 0.01 | 0.54 | 0.44 |
| Maximum height Ry (μm) | 0.21 | 2 | 3.5 |
| Adhesion strength (25° C.) MPa | 0.9 | 1.1 | 1.11 |
| Adhesion strength (80° C.) MPa | 0.63 | 0.69 | 0.71 |
| Tensile durability test (index) | 100 | 110 | 125 |

TABLE 3

Ring member: PPS

|  | Example 4 | Example 5 | Example 6 |
|---|---|---|---|
| Adhesive agent | LORD Far East Fusor 320/322 | LORD Far East Fusor 320/322 | ThreeBond 2000/2100 |
| Vulcanized rubber pretreatment | Applied | Applied | Applied |
| Resin pretreatment | Tetramethyl hexanediamine 2% n-hexane solution | Tetramethyl hexanediamine 2% n-hexane solution | Tetramethyl hexanediamine 2% n-hexane solution |
| Arithmetic average roughness Ra (μm) | 0.21 | 0.24 | 0.23 |
| Maximum height Ry (μm) | 1.61 | 1.62 | 1.6 |
| Adhesion strength (25° C.) MPa | 1.21 | 1.23 | 1.15 |
| Adhesion strength (80° C.) MPa | 0.87 | 0.89 | 0.8 |
| Tensile durability test (index) | 128 | 135 | 123 |

TABLE 4

Ring member: PPS

|  | Example 7 | Example 8 |
|---|---|---|
| Adhesive agent | ThreeBond 2000/2100 | ThreeBond 2000/2100 |
| Vulcanized rubber pretreatment | Applied | Applied |
| Resin pretreatment | Tetramethyl hexanediamine 2% n-hexane solution | Tetramethyl hexanediamine 2% n-hexane solution |
| Arithmetic average roughness Ra (μm) | 0.45 | 0.03 |
| Maximum height Ry (μm) | 2.2 | 0.6 |
| Adhesion strength (25° C.) MPa | 1.12 | 1.1 |
| Adhesion strength (80° C.) MPa | 0.73 | 0.69 |
| Tensile durability test (index) | 115 | 108 |

TABLE 5

Ring member: Polycarbonate

|  | Comparative Example 4 | Example 9 | Example 10 |
|---|---|---|---|
| Adhesive agent | LORD Far East Fusor 320/322 | LORD Far East Fusor 320/322 | ThreeBond 2000/2100 |
| Vulcanized rubber pretreatment | Applied | Applied | Applied |

TABLE 5-continued

Ring member: Polycarbonate

|  | Comparative Example 4 | Example 9 | Example 10 |
|---|---|---|---|
| Resin pretreatment | Not applied | Tetramethyl hexanediamine 2% aqueous solution | Tetramethyl hexanediamine 2% aqueous solution |
| Arithmetic average roughness Ra (μm) | 0.21 | 0.23 | 0.22 |
| Maximum height Ry (μm) | 1.61 | 1.61 | 1.62 |
| Adhesion strength (25° C.) MPa | 0.71 | 1.06 | 1.02 |
| Adhesion strength (80° C.) MPa | 0.21 | 0.71 | 0.64 |
| Tensile durability test (index) | 40 | 120 | 110 |

TABLE 6

Ring member: Polyamide

|  | Example 11 | Example 12 |
|---|---|---|
| Adhesive agent | LORD Far East Fusor 320/322 | ThreeBond 2000/2100 |
| Vulcanized rubber pretreatment | Applied | Applied |
| Resin pretreatment | Not applied | Not applied |
| Arithmetic average roughness Ra (μm) | 0.23 | 0.2 |
| Maximum height Ry (μm) | 1.43 | 1.55 |
| Adhesion strength (25° C.) MPa | 1.41 | 1.44 |
| Adhesion strength (80° C.) MPa | 1.1 | 0.93 |
| Tensile durability test (index) | No break | No break |

As shown in Tables 1 to 6, the adhesion durability test (tensile durability test) for each example of non-pneumatic tire produced the following results. In the case of using polyphenylene sulfide (PPS) or polycarbonate (PC) as the ring member, providing the adhesion layer containing an amine compound, and performing pretreatment with an amine compound, an index of 100 or more (100 to 135) was able to be obtained (see Tables 1 to 5). In the case of using polyamide (PA) as the ring member and providing the adhesion layer containing an amine compound, no break occurred even without the pretreatment (see Table 6).

It is thus possible to provide a non-pneumatic tire that has improved adhesiveness between a resin member forming a structure attached to an axle and a tread member while ensuring necessary running function.

REFERENCE SIGNS LIST 10 non-pneumatic tire
11 attachment body
12 inner cylinder
13 outer cylinder
14 ring member
15 connecting member
16 tread member
17 holding cylindrical portion
18 outer ring portion
19 rib
21 first elastic connecting plate
21a one end
21b other end
21c, 22c intermediate portion
21d to 21f curved portion
22 second elastic connecting plate
22a one end
22b other end
22d to 22f curved portion
25 adhesion layer

The invention claimed is:

1. A non-pneumatic tire comprising:
an attachment body to be attached to an axle;
a ring member including an inner cylinder externally covering the attachment body and an outer cylinder surrounding the inner cylinder from a tire radial outer side;
a plurality of connecting members arranged along a tire circumferential direction between the inner cylinder and the outer cylinder and connecting the inner cylinder and the outer cylinder to each other; and
a tread member made of vulcanized rubber and located on a tire radial outer side of the outer cylinder of the ring member,
wherein at least one part of the outer cylinder and the plurality of connecting members are integrally formed of a synthetic resin material,
the synthetic resin material contains one or a mixture of two or more of polybutylene terephthalate (PBT), polyphenylene sulfide (PPS), acrylonitrile-butadiene-styrene copolymer, polyetheretherketone (PEEK), polyacetal (POM), polyarylate (PAR), polyethersulfane (PES), polycarbonate (PC), and a polymer or a copolymer of polysulfone (PSF),
an outer circumferential surface of the outer cylinder of the ring member facing the tread member is pretreated with an amine compound, and
an adhesion layer containing an epoxy-based adhesive agent is located between the tread member and the outer cylinder of the ring member, the outer cylinder having an amino group in a surface thereof.

2. The non-pneumatic tire according to claim 1,
wherein the tread member is surface-treated using a halogen compound.

3. The non-pneumatic tire according to claim 1,
wherein the synthetic resin material contains one or a mixture of two or more of polyphenylene sulfide (PPS), and polycarbonate (PC).

4. The non-pneumatic tire according to claim 1,
wherein surface roughness (Ra) of a part of the outer cylinder adhered to the tread member is 0.02 μm to 0.5 μm.

5. The non-pneumatic tire according to claim 1,
wherein maximum height (Ry) of a part of the outer cylinder adhered to the tread member is 3 μm or less.

6. The non-pneumatic tire according to claim 1,
wherein adhesion strength of the adhesion layer measured according to Adhesives—Determination of tensile lap-shear strength of rigid-to-rigid bonded assemblies in JIS K 6850 is 1.0 MPa or more at a temperature of 25° C.

7. The non-pneumatic tire according to claim 1,
wherein adhesion strength of the adhesion layer measured according to Adhesives—Determination of tensile lap-shear strength of rigid-to-rigid bonded assemblies in JIS K 6850 is 0.3 MPa or more at a temperature of 80° C.

* * * * *